United States Patent
Kato et al.

(10) Patent No.: US 7,409,151 B2
(45) Date of Patent: Aug. 5, 2008

(54) PHOTOGRAPHING APPARATUS, IMAGE PROCESSING METHOD, AND RECORDING MEDIUM FOR RECORDING IMAGE PROCESSING PROGRAM, CAPABLE OF IMPROVING CONTRAST CHARACTERISTICS IN HIGH ZOOMING MAGNIFICATION

(75) Inventors: Yoshiyuki Kato, Tokyo (JP); Tomohiko Murakami, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 346 days.

(21) Appl. No.: 11/230,003

(22) Filed: Sep. 19, 2005

(65) Prior Publication Data

US 2006/0062558 A1 Mar. 23, 2006

(30) Foreign Application Priority Data

Sep. 22, 2004 (JP) ............................. 2004-275832

(51) Int. Cl.
  *G03B 7/00* (2006.01)
  *G03B 17/00* (2006.01)
(52) U.S. Cl. .......................................... 396/72; 396/63
(58) Field of Classification Search .................. 396/63, 396/65, 68, 72, 89, 213; 348/221.1, 222.1, 348/231.6
See application file for complete search history.

(56) References Cited

U.S. PATENT DOCUMENTS

| | | | | |
|---|---|---|---|---|
| 5,486,894 A | * | 1/1996 | Fujibayashi | ................... 396/65 |
| 5,838,371 A | * | 11/1998 | Hirose et al. | ............. 348/240.2 |
| 6,614,996 B2 | | 9/2003 | Okisu et al. | |
| 6,806,903 B1 | * | 10/2004 | Okisu et al. | ................. 348/254 |

FOREIGN PATENT DOCUMENTS

| | | |
|---|---|---|
| JP | 7-274062 A | 10/1995 |
| JP | 2003-018433 A | 1/2003 |
| JP | 2003-069942 A | 3/2003 |

OTHER PUBLICATIONS

Japanese Office Action (and English transition thereof) dated Feb. 5, 2008, issued in a counterpart Japanese Application.

* cited by examiner

*Primary Examiner*—Rodney E Fuller
(74) *Attorney, Agent, or Firm*—Frishauf, Holtz, Goodman & Chick, P.C.

(57) ABSTRACT

In a photographing apparatus, while a deterioration of a contrast characteristic caused by an optical zooming operation is prevented, superior photographic images are continuously acquired. Magnification set by an optical zooming function is acquired, and a gamma curve, namely gradation correcting information is set to a gamma lookup table, while the gamma curve is applied during a photographing operation based upon the acquired set magnification. A gamma correcting unit corrects gradation of image data (namely, RAW data) outputted from an imaging element by employing gradation correcting information set in this gamma lookup table.

12 Claims, 7 Drawing Sheets

| OPTICAL ZOOMING STEP | REFERENCE SHIFT AMOUNT |
|---|---|
| 0 | 0 |
| 1 | 0 |
| 2 | 0 |
| 3 | 2 |
| 4 | 4 |
| 5 | 8 |
| 6 | 8 |

| OPTICAL ZOOMING STEP | TABLE NO. |
|---|---|
| 0 | A |
| 1 | A |
| 2 | A |
| 3 | B |
| 4 | C |
| 5 | D |
| 6 | D |

PHOTOGRAPHING APPARATUS, IMAGE PROCESSING METHOD, AND RECORDING MEDIUM FOR RECORDING IMAGE PROCESSING PROGRAM, CAPABLE OF IMPROVING CONTRAST CHARACTERISTICS IN HIGH ZOOMING MAGNIFICATION

CROSS-REFERENCE TO RELATED APPLICATIONS

This application is based upon and claims the benefit of priority from prior Japanese Patent Applications No. 2004-275832, filed Sep. 22, 2004, the entire contents of both of which are incorporated herein by reference.

BACKGROUND OF THE INVENTION

The present invention generally relates to a photographing apparatus, an image processing method, and a recording medium for recording an image processing program. More specifically, the present invention is related to such a photographing apparatus as a digital camera equipped with an optical zooming function, an image processing method employed in the digital camera, and a recording medium for recording thereon the image processing program, capable of improving contrast characteristics deteriorated in zooming magnification.

Among photographing apparatus such as digital cameras, some photographing apparatus are equipped with optical zooming functions. This optical zooming function corresponds to such a function that since a lens optical system is moved, a focal distance of this lens optical system is physically changed so as to be capable of changing an enlarging ratio of an image.

Conventionally, in a photographing apparatus equipped with such an optical zooming function, a contrast characteristic of a photographed image acquired at a wide terminal (wide angle side, namely under condition that focal distance becomes "shortest") is different from a contrast characteristic of a photographed image acquired at a telescopic terminal (telephotograph side, namely under condition that focal distance becomes "longest"). In particular, when zooming magnification becomes high, namely at the telescopic terminal (telephotograph side), a photographed image owns no contrast feeling, and therefore, is brought into such an image condition that a black image portion of this photographed image is floating. Such a phenomenon that a contrast feeling disappears is referred to as a "flare." This "flare" phenomenon is caused by lens characteristics of an optical system.

Very recently, since compact digital cameras are commercially available, there is such a trend that optical lenses mounted on these digital cameras are manufactured in smaller sizes. As a result, when zooming magnification is increased, the following problem may occur. That is, since the above-explained "flare" phenomenon is increased, contrast characteristics are considerably deteriorated.

In this connection as a method for correcting a brightness of an image, there is a method for controlling an exposure during a photographing operation. For instance, Japanese Laid-open Patent Application No. Hei-7-274062 discloses the following image exposure correcting method. That is, since the diaphragm/shutter mechanism is controlled in such a manner that the exposure amount obtained when the maximum Y signal (maximum luminance signal) is acquired may be nearly equal to 70 to 100% of the dynamic range of the CCD, the exposing control operation can be properly carried out under such a condition that a light photographic object may become lighter, whereas a dark photographic object may become darker.

However, the brightness correcting method described in the above-explained patent publication merely corresponds to an exposure correcting method. As a consequence, even though the brightness of the entire image can be adjusted, this brightness correcting method cannot avoid that the above-described contract characteristic is deteriorated due to the zooming magnification.

It should be understood that as a method capable of correcting a brightness of a photographed image, for instance, there is such a method for using specific software installed in a personal computer. However, this brightness correcting software method owns other problems, namely requirements of very cumbersome works. That is, a user is necessarily required to acquire photographed images into the personal computer. Also, while the user must confirm the brightnesses of the photographed images on the display screen, the user is required to fine-adjust the contrast of these confirmed images by performing a predetermined contrast adjusting operation in the manual manner.

SUMMARY OF THE INVENTION

The present invention has been made to solve the above-explained problems, and therefore, has an object to provide a photographing apparatus equipped with an optical zooming function, an image processing method, and a recording medium, which can improve deteriorations of contrast characteristics occurred in zooming magnification.

To achieve the above-described object, a photographing apparatus, according to an aspect of the present invention, is featured by comprising: an optical zooming unit for moving a lens so as to change an enlarging ratio of a photographic object; an imaging unit for imaging the photographic object; a magnification acquiring unit for acquiring magnification set by the optical zooming unit; a gradation setting unit for setting gradation correcting information which is applied during a photographing operation based upon the set magnification acquired by the magnification acquiring unit; and a correcting unit for correcting gradation of image data outputted from the imaging unit by employing the gradation correcting information set by the gradation setting unit.

Also, an image processing method, according to another aspect of the present invention, is featured by such an image processing method used in a photographing apparatus equipped with an imaging unit for imaging a photographic object and an optical zooming function; comprising: a magnification acquiring step for acquiring magnification set by the optical zooming function; a gradation setting step for setting gradation correcting information which is applied during a photographing operation based upon the set magnification acquired by the magnification acquiring step; and a correcting step for correcting gradation of image data outputted from the imaging unit by employing the gradation correcting information set by the gradation setting step.

Furthermore, a recording medium, according to a further aspect of the present invention, is featured by such a recording medium for recording thereon an image processing method executed by a computer which is mounted on a photographing apparatus equipped with an imaging unit for imaging a photographic object and an optical zooming function, in which the image processing method causes the computer to realize: a magnification acquiring step for acquiring magnification set by the optical zooming function; a gradation setting step for setting gradation correcting information which is applied during a photographing operation based upon the set magnification acquired by the magnification acquiring step; and a correcting step for correcting gradation of image data outputted from the imaging unit by employing the gradation correcting information set by the gradation setting step.

BRIEF DESCRIPTION OF THE DRAWINGS

For a better understanding of the present invention, reference is made of a detailed description to be read in conjunction with the accompanying drawings, in which:

FIG. 1 is a perspective view for representing an outer appearance of a digital camera corresponding to a photographing apparatus according to a first embodiment of the present invention.

DESCRIPTION OF THE PREFERRED EMBODIMENTS

Referring now to drawings, various preferred embodiments of the present invention will be described.

Outer Appearance of First Digital Camera

Figure 1A:
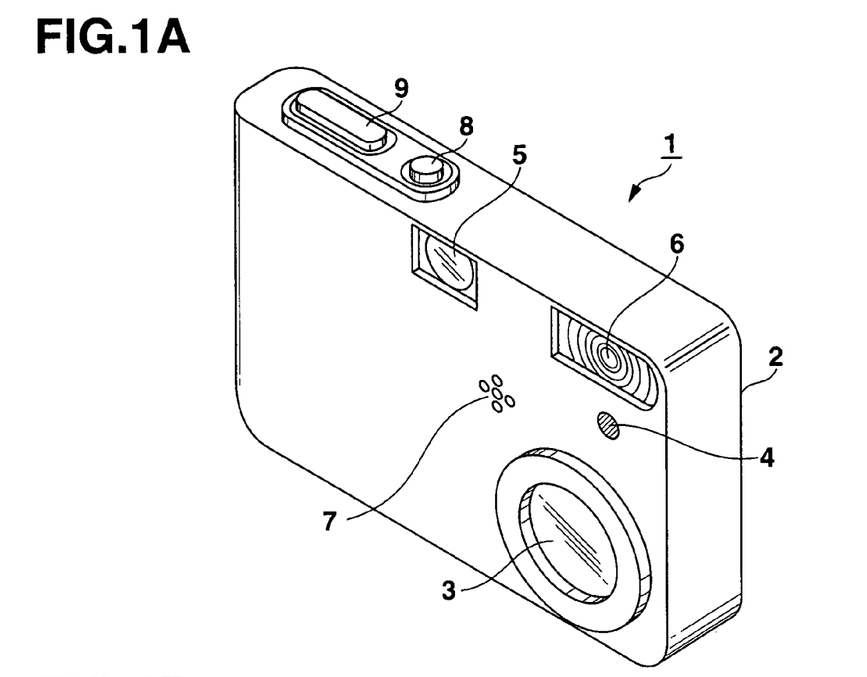
FIG. 1A illustratively and mainly shows a front structure of the digital camera.
Figure 1B:
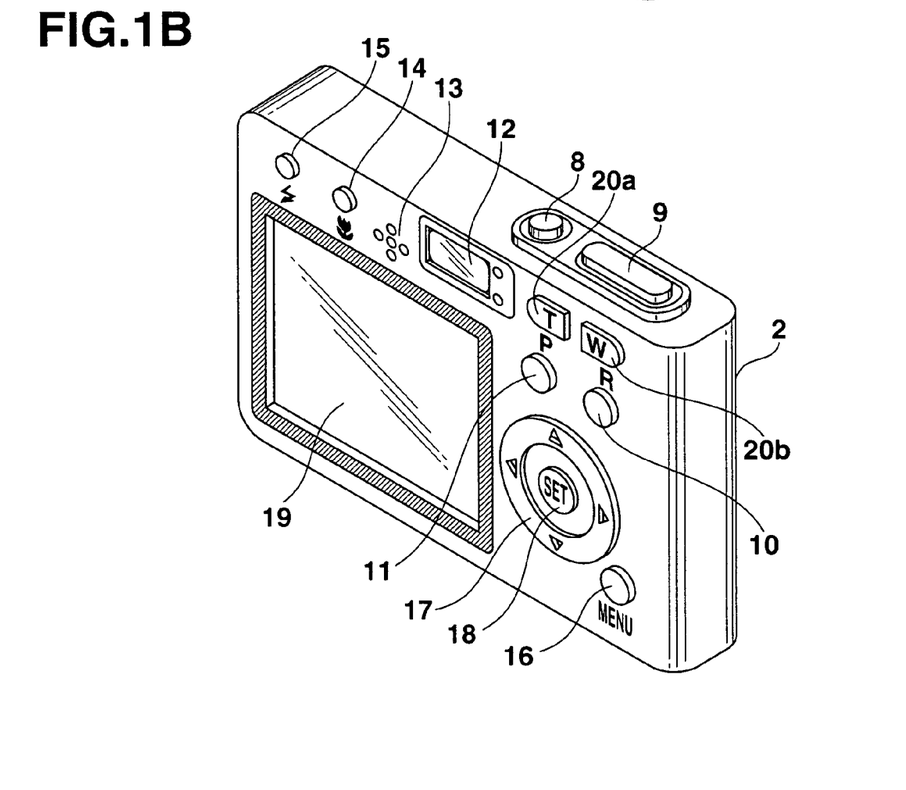
FIG. 1B illustratively and mainly indicates a rear structure of the digital camera.

FIG. 1 is a perspective view for representing an outer appearance of a digital camera 1 corresponding to a photographing apparatus according to a first embodiment of the present invention. Namely, FIG. 1A illustratively and mainly shows a front structure of the digital camera 1, and FIG. 1B illustratively and mainly indicates a rear structure of the digital camera 1.

On a front surface of a thin plate-shaped body 2 having a substantially rectangular shape in this digital camera 1, a photographing lens 3, a self-timer lamp 4, a window 5 of an optical view finder, a strobe light emitting unit 6, a microphone unit 7, and the like have been provided. Further, a power supply key 8, a shutter key 9, and the like have been provided on a right edge side of an upper surface of this digital camera 1, as viewed from a user side.

The power supply key 8 corresponds to such a key which is manipulated when a power supply (not shown in detail) is turned ON/OFF. The shutter key 9 corresponds to a key for instructing photographing timing when a photographing operation is carried out.

Also, a photograph mode (R) key 10, a reproduction mode (P) key 11, an optical view finder 12, a speaker unit 13, a macro key 14, a strobe key 15, a menu (MENU) key 16, a ring key 17, a set (SET) key 18, a display unit 19, and the like have been provided.

Since the photograph mode key 10 is manipulated from a power-OFF condition, the power supply is automatically turned ON and the operation mode of this digital camera 1 is advanced to a photograph mode of a still image. Also, since the photograph mode key 10 is repeatedly manipulated from a power-ON condition, both a still image mode and a moving picture mode are set in a cyclical manner. The still image mode corresponds to such a mode that a still image is photographed. Also, the moving picture mode corresponds to such a mode that a moving picture is photographed. More specifically, in this first embodiment, it is so assumed that the digital camera 1 can photograph moving pictures with voice.

The shutter key 9 maybe commonly used in these photograph modes. In other words, in the still image mode, a photographing operation of a still image is carried out at timing when the shutter key 9 is depressed. In the moving picture mode, a photographing operation of a moving picture is commenced at timing when the shutter key 9 is depressed, and then, this photographing operation of the moving picture is accomplished at timing when the shutter key 9 is again depressed.

Since the reproduction mode key 11 is manipulated from power-OFF condition, the power supply is automatically turned ON and the operation mode is advanced to a reproduction mode.

The macro key 14 is manipulated when the normal photographing operation and the macro-photographing operation are switched in the still image photographing mode. The strobe key 15 is operated when a light emitting mode of the strobe light emitting unit 6 is switched. The menu key 16 is manipulated when various sorts of menu items and the like are selected. The ring key 17 is manufactured by forming item selection-purpose keys in an integral form along upper/lower/right/left directions. The set key 18 which in located at a center position of this ring key 17 is manipulated when an item selected at this time is set.

The display unit 19 is constituted by a color liquid crystal panel equipped with a back light. This display unit 19 monitor-displays thereon a through image as an electronic view finder when the photograph mode is selected, and reproduces a selected image when the reproduction mode is selected so as to display the reproduced image.

Also, while the digital camera 1 is equipped with an optical zooming function, a focal distance is physically changed by manipulating one zoom key 20a and another zoom key 20b, so that an enlarging ratio of an image can be changed. One zoom key 20a within these zoom keys 20a and 20b is provided for a telescopic terminal (namely, telephotograph), and is used in such a case that the zooming magnification to the side of telescopic terminal is changed. The other zoom key 20b is provided for a wide terminal (namely, wide-angle photograph), and is used in such a case that the zooming magnification to the side of the wide angle is changed.

Although not shown in this drawing, a memory card slot, a serial interface connector, and the like have been provided on a bottom plane of the digital camera 1. The memory card slot is employed so as to mount/dismount a memory card which is employed as a recording medium. The serial interface connector is realized as, for instance, a USB (Universal Serial Bus) connector which is used so as to be connected to a personal computer, or the like provided outside the own digital camera 1.

Electronic Circuit Arrangement of First Digital Camera

Figure 2:
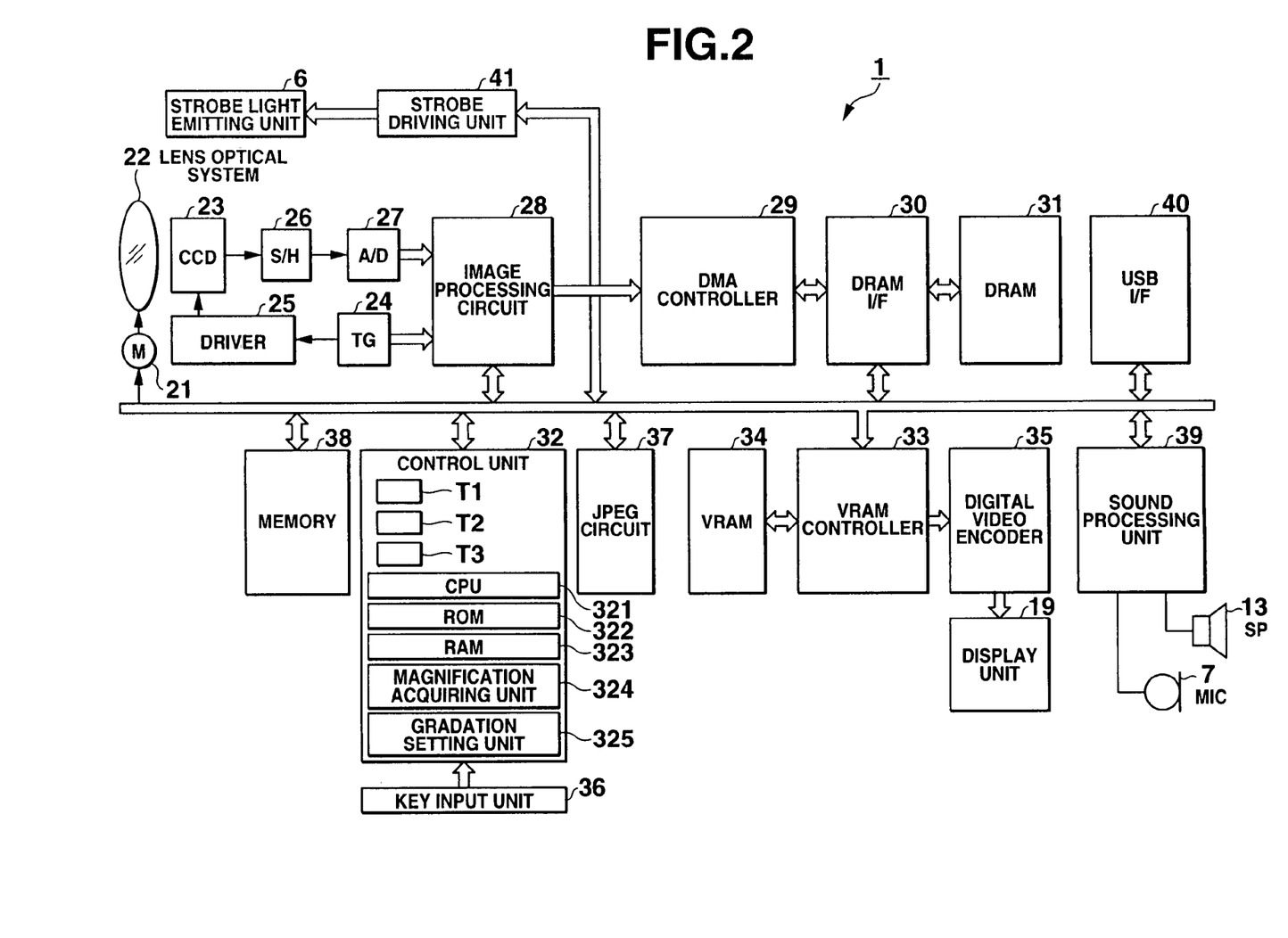
FIG. 2 is a schematic block diagram for indicating an electronic circuit arrangement of the digital camera according to the first embodiment.

FIG. 2 is a block diagram for schematically showing an electronic circuit arrangement of the above-described digital camera 1 according to the first embodiment.

In the digital camera 1, a lens optical system (namely, optical zooming unit) 22 has been provided in such a manner that the lens optical system 22 can be moved by a motor 21 within a predetermined range along an optical axis direction, and also, a CCD (namely, imaging unit) 23 corresponding to an imaging element has been arranged in a backward direction of this optical axis. The lens optical system 22 contains a focus lens (not shown) and a zoom lens (not shown either), which constitute the above-described photographing lens 3. This CCD (charge-coupled device) 23 receives light reflected from the respective portions of a photographic object and entered via the photographing lens 3, and then, outputs electric signals in response to intensity of the received light.

In a recording mode corresponding to the basic mode, the CCD 23 is driven in a scanning mode by a timing generator (TG) 24 and a driver 25 so as to output 1-screen signal amount of photoelectrically converted outputs which correspond to focused optical images for a predetermined time period. This photoelectrically converted output signal from the CCD 23 is processed in such a manner that gains of the respective primary color components of R(red), G(green), B(blue) colors are controlled under analog signal value conditions. Thereafter, the gain-controlled analog photoelectric converted signals are sample/hold-processed by a sample/hold circuit 26, and the sample/hold-processed signal is A/D-converted by an A/D converter 27 into digital image data.

Then, in an image processing circuit 28, an image processing operation containing both a pixel interpolation processing operation and a "γ (gamma)" correction processing operation is carried out so as to produce a luminance signal "Y" having a digital value and color difference signals "U", "V(Cb, Cr)", which are outputted to a DMA (Direct Memory Access) controller 29.

The DMA controller 29 once writes both the luminance signal "Y" and the color difference signals "U" and "V" outputted from the image processing circuit 28 into buffer memories (not shown in detail) provided in the own DMA controller 29 by a composite synchronous signal, a memory write enable signal, and a clock signal, which are outputted from the image processing circuit 28. Then, the DMA controller 29 DMA-transfers these luminance signal "Y" and color difference signals "U" and "V" via a DRAM interface (I/F) 30 to a DRAM 31 which is used as a buffer memory.

A control unit 32 controls an entire system of the digital camera 1 according to the first embodiment. The control unit 32 is arranged by employing a microcomputer which contains a CPU 321, a ROM 322, a RAM 323, a magnification acquiring unit 324, a gradation setting unit 325, and the like. The ROM 322 has previously stored thereinto an operating program which is executed by the CPU 321. The RAM 323 is used as a work memory. The magnification acquiring unit 324 acquires zooming magnification set by the lens optical system 22. The gradation setting unit 325 sets gradation correcting information which is applied during photographing operation based upon the set magnification. After the above-described luminance signal "Y" and color difference signals U and V have been transferred to the DRAM 31, this control unit 32 reads out the luminance signal "Y" and the color difference signals U and V via the DRAM interface 30 from the DRAM 31, and then, writes these signals via a VRAM controller 33 to a VRAM 34.

A digital video encoder 35 reads out the luminance signal "Y" and the color difference signals "U" and "V" via the VRAM controller 33 from the VRAM 34 in a periodic manner so as to produce a video signal based upon these read luminance and color difference data, and then, outputs the produced video signal to the display unit 19.

As previously described, the display unit 19 functions as a monitor display unit (electronic view finder) when a photographing operation is performed. That is, since the display unit 19 executes such a display operation based upon a video signal derived from the digital video encoder 35, this display unit 19 displays thereon still images in real time based upon image information acquired from the VRAM controller 33 at this time.

As explained above, under such a condition that the image acquired at this time is displayed as a monitor image in real time on the display unit 19, when the shutter key 9 is depressed at such a timing that, for instance, a user wants to perform a still image photographing operation, a trigger signal is generated from this shutter key 9.

In response to this trigger signal, the control unit 32 immediately stops the data path from the CCD 23 to the DRAM 31 just after 1-screen signal amounts of the luminance signal "Y" and the color difference signals U and V acquired from the CCD 23 at this timing to the DRAM 31, and transfers the present operating condition thereof to a recording/holding condition.

Under this recording/holding condition, the control unit 32 reads out a 1-frame signal amount of both the luminance signal "Y" and the color difference signals "U" and "V", which have been written in the DRAM 31, via the DRAM interface 30 from this DRAM 31 in the unit called as a "basic block" with respect to each of the signal components "Y", "Cb", "Cr", while this basic block is constituted by 8 pixels along the longitudinal direction and 8 pixels along the lateral direction. Then, the control unit 32 writes the read luminance signal "Y" and color difference signals "U" and "V" into a JPEG (Joint Photograph coding Experts Group) circuit 37. The JPEG circuit 37 performs a data compressing operation with respect to the written signals by executing such process operations as an ADCT (Adaptive Discrete Cosine Transform), a Huffman coding method corresponding to an entropy coding method, and the like.

Then, the compressed coding data is read out from the JPEG circuit 37 as a data file of one image, and the read data file is written into a recording-purpose memory 38. As this recording-purpose memory 38, an internal memory such as a flash memory which has been previously built in the main body of the digital camera 1 may be used. In addition, a memory card may be used which is detachably mounted on this digital camera 1 as a recording medium. After the compressing process operation as to the 1-frame signal amount of the luminance signal "Y" and the color difference signals "U" and "V" are accomplished and the writing operation of all of the compressed data into the memory 38 is accomplished, the control unit 32 again initiates the data path from the CCD 23 to the DRAM 31.

Further, a sound processing unit 39, a USB interface (I/F) 40, and a strobe driving unit 41 have been connected to the control unit 32.

The sound processing unit 39 is equipped with a sound source circuit such as a PCM sound source. When voice is recorded in this digital camera 1, the sound processing unit 39 digitally processes a speech signal inputted from the above-described microphone unit (MIC) 7 to obtain digital speech data, and compresses this digital speech data in accordance with a predetermined data file format, for example, the MP3 (MPEG-1 audio layer 3) specification so as to form a speech data file, and then, supplies the speech data file to the memory 38. On the other hand, when voice is reproduced in this digital camera 1, the sound processing unit 39 expands a compressed speech data file which is read out from the memory 38 so as to produce an analog speech signal, and then, supplies this analog speech signal to the speaker unit (SP) 13 so as to reproduce voice, as previously explained, while the speaker unit 13 has been provided on the side of the rear surface of the digital camera 1.

The USB interface 40 performs a communication control operation in the case that image data and other data are transmitted and received between the own USB interface 40 and another information terminal apparatus such as a personal computer which is connected thereto via a USB connector. After the strobe driving unit 41 charges a strobe-purpose capacitor having a large capacity (not shown) when a photographing operation is carried out, the strobe driving unit 41 drives the strobe light emitting unit 6 so as to ignite the strobe lamp under control of the control unit 32.

It should be understood that the above-described key input unit 36 is constituted by the power supply key 8, the photograph mode key 10, the reproduction mode key 11, the macro key 14, the strobe key 15, the menu key 16, the ring key 17, the set key 18, the zoom keys 20a and 20b, and the like, in addition to the above-explained shutter key 9. Signals which are produced by manipulating these keys are directly supplied to the control unit 32.

Also, while not such a still image, but a moving picture is photographed, when the shutter key 9 is depressed, the photographed moving picture data is compressed by the above-explained JPEG circuit 37 by way of the motion-JPEG (Joint Photographic Experts Group) method, or the like, and then, the compressed moving picture data is recorded in the recording-purpose memory 38. When the shutter key 9 is again manipulated, the recording operation of the moving picture data is accomplished.

On the other hand, when the reproduction mode corresponding to the basic mode is selected, the control unit 32 selectively reads out image data which has been compressed and recorded in the memory 38, and thereafter, the JPEG circuit 37 expands this compressed image data in such a data processing sequence which is completely opposite to the above-described data processing sequence when the image data is compressed in the recording mode. Then, the expanded image data is stored via the DRAM interface 30 into the DRAM 31, and thereafter, the image data content stored in this DRAM 31 is stored via the VRAM controller 33 into the VRAM 34. Thus, the control unit 32 reads out the image data from the VRAM 34 in a periodic manner so as to generate a video signal, and then, causes the display unit 19 to reproduce this generated video signal so as to output the reproduced image on this display unit 19.

Further, in such a case that selected image data corresponds not to a still image, but a moving picture, the JPEG circuit 37 sequentially reproduces still image data of a plurality of frames which constitute the moving picture data thereof in a time sequential manner, and thus, the reproduced still images are sequentially displayed on the display unit 19 under control of the control unit 32. At the time when the reproducing operations of all of the still image data are accomplished, for example, such a still picture data located at a head position is displayed until a next reproducing instruction is issued.

Functional Structure of Image Processing Circuit 38

Figure 3:
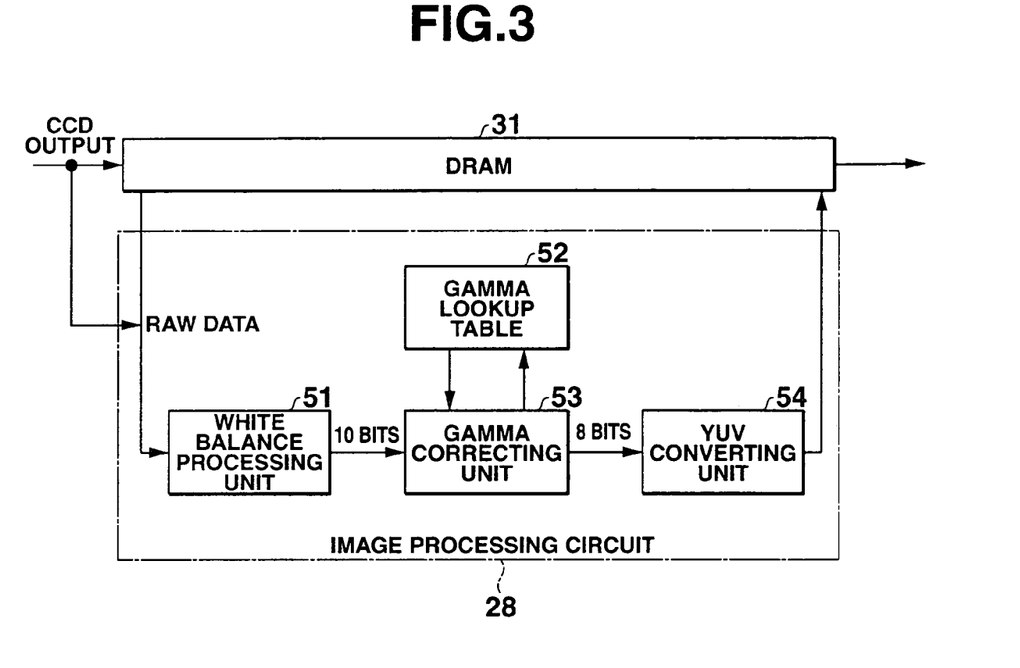
FIG. 3 is a schematic block diagram for representing a functional arrangement of an image processing circuit provided in the digital camera according to the first embodiment.

FIG. 3 is a schematic block diagram for indicating a functional structure of the above-explained image processing circuit 28. In order to easily represent data flows between the image processing circuit 28 and the DRAM 31, the DMA controller 29, the DRAM interface (I/F) 30, and the like, which are shown in FIG. 2, have been omitted from the functional structure of the image processing circuit 28.

It should also be noted that the expression "CCD output" implies digital image data which is outputted from the CCD 23 via the sample/hold circuit 26 and the A/D converter 27 during a photographing operation. In this first embodiment, since the A/D converter 27 arranged in 10 bits is employed, such a digital image data made of 10 bits is inputted to the image processing circuit 28. This digital image data which has not yet been processed will be referred to as "RAW data" hereinafter. This "RAW data" is once stored in an image area of the DRAM 31 which is employed as the buffer memory, and thereafter, this RAW data is read out from the above-explained image area and is supplied to the image processing circuit 28 in order that the image processing circuit 28 processes this read RAW data.

Alternatively, the digital camera 1 may be arranged in such a manner that the RAW data may be directly processed by the image processing circuit 28 while the RAW data is not stored in the image area of the DRAM 31. Furthermore, as the buffer memory, not only the DRAM 31, but also an SDRAM may be alternatively employed, and thus, the present invention is not specifically limited only to these arrangements.

The image processing circuit 28 is constructed of a single LSI (Large-Scaled Integration) chip. This image processing circuit 28 is equipped with a white balance processing unit (WB processing unit) 51, a gamma lookup table (gamma LUT) 52, a gamma correcting unit (correcting unit) 53, and a YUV converting unit 54 as basic structural elements thereof. The white balance processing unit 51 multiplies the RAW data by a predetermined WB gain. The gamma lookup table 52 inputs 10-bit data and outputs 8-bit data. The gamma correcting unit 53 refers to the gamma lookup table 52 in order to correct gradation of the RAW data after being multiplied by the WB gain. The YUV converting unit 54 YUV-converts the RAW data after the gradation has been corrected.

It should also be noted that the processing operation executed in the hardware manner of this image processing circuit 28 may be alternatively carried out in a software manner executed on the side of the control unit 32 corresponding to the microprocessor. However, if all of the process operations are executed in the software manner, then a lengthy time is necessarily required. As a consequence, it is preferable to arrange these basic structural elements as to at least the white balance processing unit 51, the gamma lookup table 52, the gamma correcting unit 53, the YUV converting unit 54, and the like in the hardware manner.

Gradation Correcting Information

Now, a description is made of gamma curves (namely, gradation correcting information) which are set to the gamma lookup table 52.

Both a gamma table "T1" (first storage unit) and a control table "T2" (second storage unit) have been provided in the control unit 32 shown in FIG. 2. In the gamma table T1, a gamma curve (gradation correcting information) which constitutes a reference has been previously stored. The control table T2 is used in order to change the gamma curve previously stored in this gamma table T1 in response to magnification set by optical zooming function.

Figure 4:
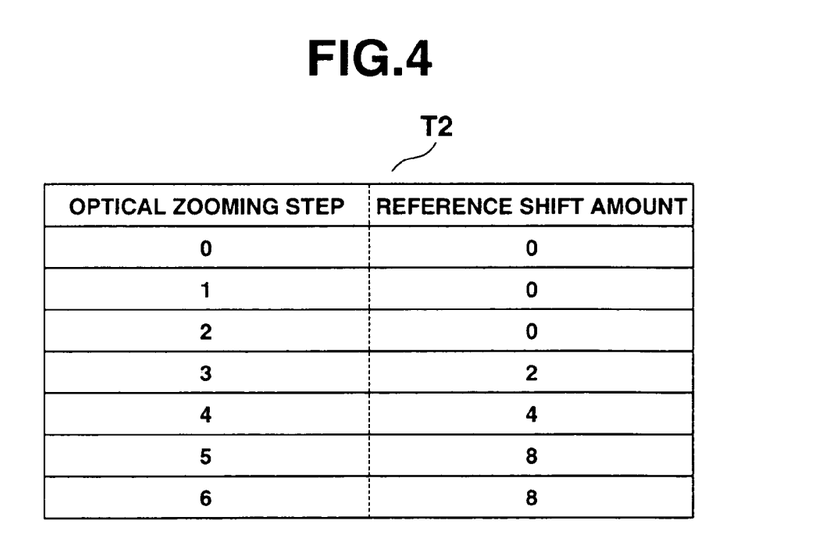
FIG. 4 is a diagram for illustratively showing a structure of a control table "T2" provided in the digital camera according to the first embodiment.

FIG. 4 schematically shows a structure of the above-explained control table "T2." It is now assumed that since the zoom keys 20a and 20b are manipulated, the zooming lens contained in the lens optical system 22 is moved in 7 different steps defined from a zooming step "0" to a zooming step "6", so that desirable zoom magnification may be set. It should also be noted that the above-explained zooming step "6" corresponds to the telescopic terminal (telephotography) side, and also corresponds to maximum magnification in this control table T2.

In this control table T2, such a changing information has been stored, while this changing information is employed so as to change at least gradation of a black color with respect to each of these seven zooming steps. Concretely speaking, a reference shift amount used to shift the gamma curve of the gamma table T1 in a direction along which an output becomes dark with respect to an input has been previously stored as the changing information in this control table T2. It should also be understood that this reference shift amount has been determined based upon a black floating amount of an image which has been previously measured every zooming step. For instance, a reference shift amount "2" implies that the gamma curve is shifted by two stages of gradation in such a direction along which an output becomes dark with respect to an input (refer to FIG. 6).

In this case, as shown in the example of FIG. 4, this control table T2 has been set in such a manner that the higher the zoom magnification is increased, the larger the reference shift amount is increased. The larger this shift amount becomes, the wider the output range of the black gradation is widened, as well as, the stronger the black image portion of the image is emphasized.

The gamma curve which has been changed based upon the above-described reference shift amount is set to the gamma lookup table 52, and thus, is employed so as to correct gradation of image data when a photographing operation is carried out.

Figure 5:
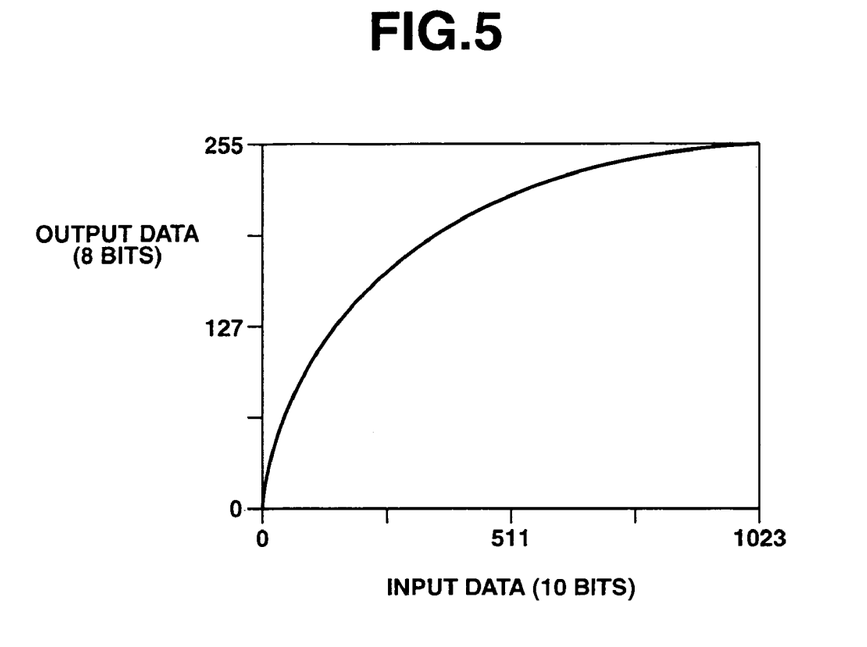
FIG. 5 is a graphic diagram for representing an example of a standard gamma curve (namely, gamma curve before being changed) of the digital camera according to the first embodiment.
Figure 6:
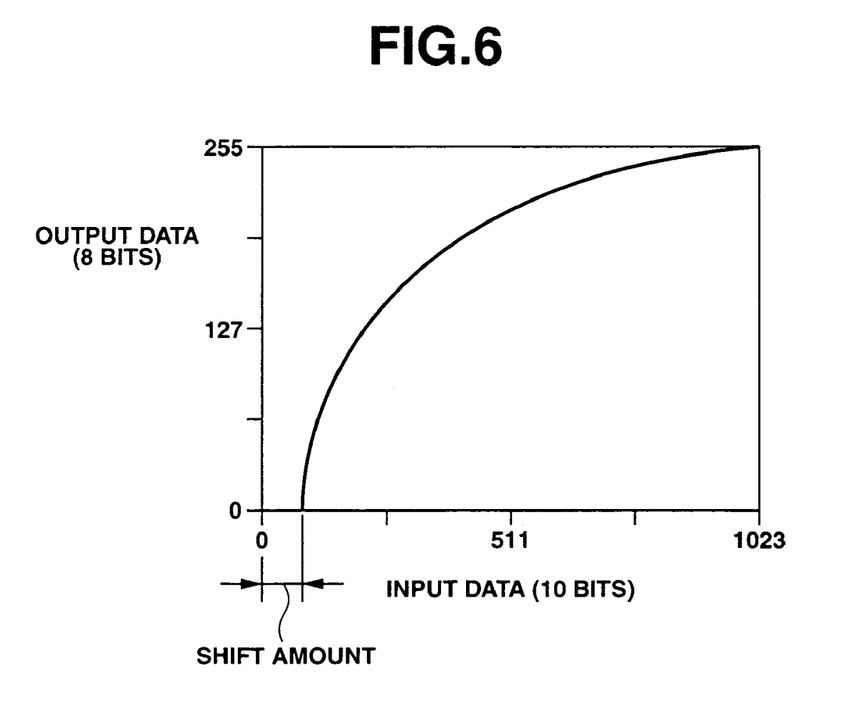
FIG. 6 is a graphic diagram for indicating an example of a gamma curve after being changed as to the digital camera according to the first embodiment.

FIG. 5 graphically shows an example of a standard gamma curve (namely, gamma curve before being changed), and FIG. 6 graphically indicates an example of a gamma curve after being changed. An abscissa of each of the graphic representations indicates input image data and an ordinate thereof shows output image data. Also, in these graphic representations, the input image data is selected to be 10 bits (1024 gradation), whereas the output image data is selected to be 8 bits (256 gradation).

In this case, as to the standard gamma curve shown in FIG. 5, an input value of "0" is defined as a starting point of this gamma curve. In contrast to the standard gamma curve, as to the gamma curve after being changed indicated in FIG. 6, a starting point thereof is shifted by a reference shift amount along the right direction. Since the starting point is shifted, the range of the black color of the output image data with respect to the input image data may be widened. As a result, such an image whose black image portion has been emphasized may be obtained.

It should also be understood that the above-explained gamma table "T1" is prepared with respect to a certain single photograph mode. In such a case that a plurality of different photograph modes have been prepared, for example, a "standard" contrast mode, a "high" contrast mode, a "low" contrast mode, and a "strobe" photograph mode have been prepared with the first digital camera 1, a gamma table having a predetermined gradation characteristic have been prepared with respect to each of these plural photograph modes.

Processing Operations of First Digital Camera

Next, a description is made of processing operations executed by the digital camera 1 according to the first embodiment.

Figure 7:
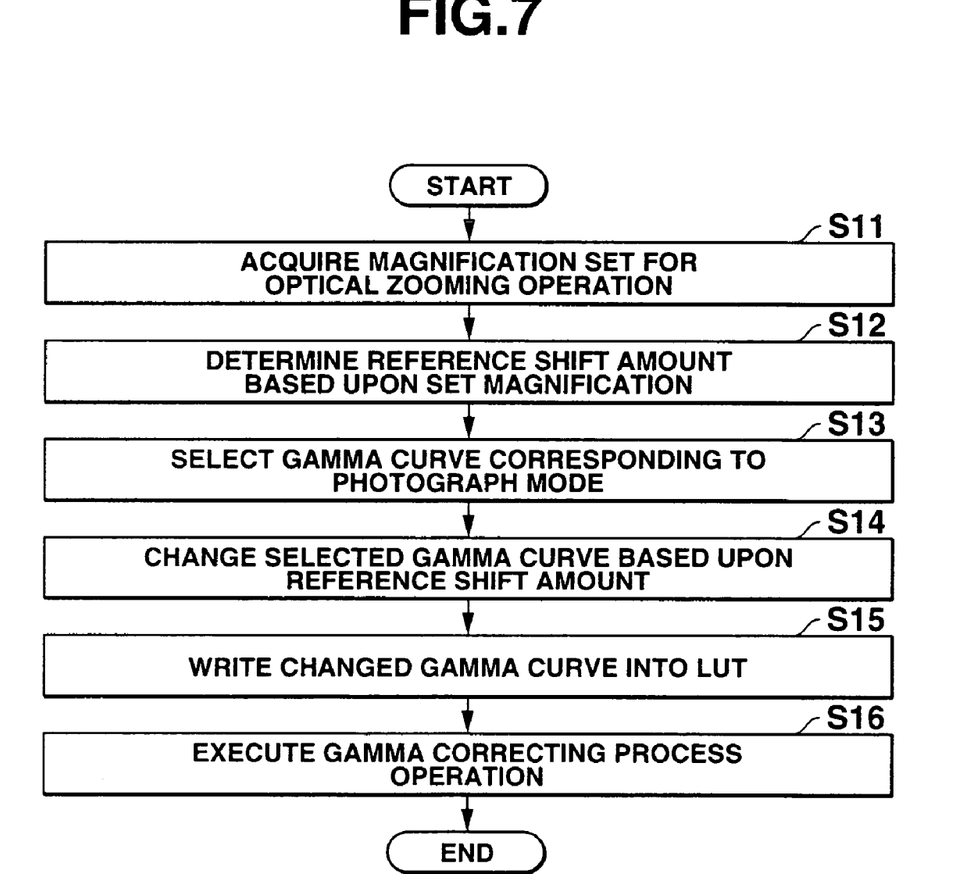
FIG. 7 is a flow chart for describing image processing operations of the digital camera according to the first embodiment.

FIG. 7 is a flow chart for describing processing operations executed by the digital camera 1 according to this first embodiment. It should be understood that the above-described processing operations of the digital camera 1 may be realized by that the control unit 32 corresponding to the microprocessor mounted on the digital camera 1 reads out the program previously stored in the ROM 322 and executes the read program.

As previously explained, since the zoom keys 20a and 20b are manipulated, the zoom lens contained in the lens optical system 22 is moved in the seven zooming steps "0" to "6" so as to set desirable zooming magnification.

When the desirable zooming magnification is set, the control unit 32 acquires the set magnification at this time (step S11 of FIG. 7). Precisely speaking, this set magnification corresponds to a numeral value of such a zooming step when the zoom lens is positioned. Then, the control unit 32 retrieves the control table T2 based upon the above-explained set magnification so as to determine a reference shift amount which is used for changing a gamma curve (step S12).

Also, the control unit 32 selects such a gamma curve which corresponds to a photograph mode (step S13). That is, in such a case that a plurality of gamma curves have been stored in this gamma table T1, the control unit 32 selects such a gamma curve which corresponds to the presently set photograph mode from these plural gamma curves.

Normally, a photograph mode can be arbitrarily set by a user who manipulates the photograph mode key 10. Alternatively, a proper photograph mode may be automatically set based upon a photograph condition such as an exposure condition on the side of the digital camera 1. Also, when only one photograph mode is prepared, the above-explained gamma curve selecting process operation is no longer required.

Subsequently, the control unit 32 changes the selected gamma curve based upon the reference shift amount determined in the above-described step S12 (step S14). For example, in such a case that the selected gamma curve owns such a gradation characteristic as indicated in FIG. 5, the starting point of this gamma curve is shifted by the reference shift amount along the right direction (see FIG. 6), so that the range of the black color of the output image data with respect to the input image data may be widened. In this case, since an upper portion of this gamma curve, namely, such a curve portion having a higher gradation value (i.e., light portion) exceeds a predetermined range by the shifted amount along the right direction, this upper portion of the gamma curve is deleted.

For instance, when the reference shift amount is selected to be "4", the respective gradation values of the gamma curves before/after being changed are given as follows:

Before being changed: ORIGINAL TABLE [1024]=0, 1, 3, 6, 9, 13, - - - , 255.

After being changed: ORIGINAL TABLE [1024]=0, 0, 0, 0, 1, 3, 6, 9, 13, - - - , 255.

When the reference gamma curve read out from the gamma table T1 is changed in response to the zooming magnification in accordance with the above-described manner, the control unit 32 writes this gamma curve after being changed into the gamma lookup table 52 provided in the image processing circuit 28 as such a gamma curve which is applied during photographing operation (step S15). It should also be noted that when the above-described reference shift amount is equal to "0", the control unit 32 directly writes a reference gamma curve read out from the gamma table T1 into the gamma lookup table 52 without changing this read reference gamma curve.

Subsequently, as previously explained with reference to FIG. 3, in the image processing circuit 28, the gradation of the RAW data is corrected by employing the gamma curve written into the gamma lookup table 52 (step S15). The RAW data whose gradation has been corrected is converted into such a RAW data having the YUV format, and this RAW data having the YUV format is once stored in the DRAM 31. Thereafter, this stored RAW data is read from the DRAM 31 at predetermined timing, and then, this read RAW data is compressed in accordance with the JPEG format. Finally, the JPEG format-compressed RAW data is recorded and held as the photographed image in the data storage-purpose memory 38.

As previously described, the gamma curve is properly changed in response to the set magnification of the optical zoom when the photographing operation is carried out so as to correct the gradation of the image data, so that the contrast characteristics which are different from each other depending upon the zooming magnification can be improved in the digital camera 1. As a result, for instance, while the so-called "black floating" status which has occurred at the telescopic terminal is eliminated, better photographed images can be continuously obtained.

Also, the proper gamma curve is previously obtained by properly performing the calculation based upon the gamma curve which constitutes the reference gamma curve, so that a plurality of gamma curves need not be prepared with respect to each of the zooming magnification, but also, the memory capacity can be saved by reducing these plural gamma curves. Moreover, even in such a case that a large number of different photograph modes are prepared in the digital camera 1, since the control table T2 can be commonly used with respect to the gamma curves of these photograph modes, this digital camera 1 can be properly operated without increasing the memory capacity.

As indicated in FIG. 6, in the first embodiment, the entire portion of the gamma curve has been uniformly shifted in response to the zooming magnification. Alternatively, for instance, only a predetermined range (lower side of gamma curve) on the black color side of a gamma curve may be partially shifted by such an amount responding to the zooming magnification. In summary, if the proper contrast characteristic can be obtained in response to the zooming magnification, then there is no limitation as to the changing method thereof.

Structure of Second Digital Camera

Next, a description is made of a digital camera according to a second embodiment of the present invention.

In the above-described first embodiment, the gamma curve which constitutes the reference gamma curve has been previously and properly changed in response to the set magnification. In contrast, the digital camera of the second embodiment is featured by that while a plurality of gamma curves have been previously prepared with respect to each of zooming magnification, these plural gamma curves are selected in response to set magnification and the selected gamma curve is used. It should be understood that since an arrangement of the above-described digital camera according to the second embodiment is substantially identical to that of the first embodiment, this arrangement is not specifically shown.

Figure 8:
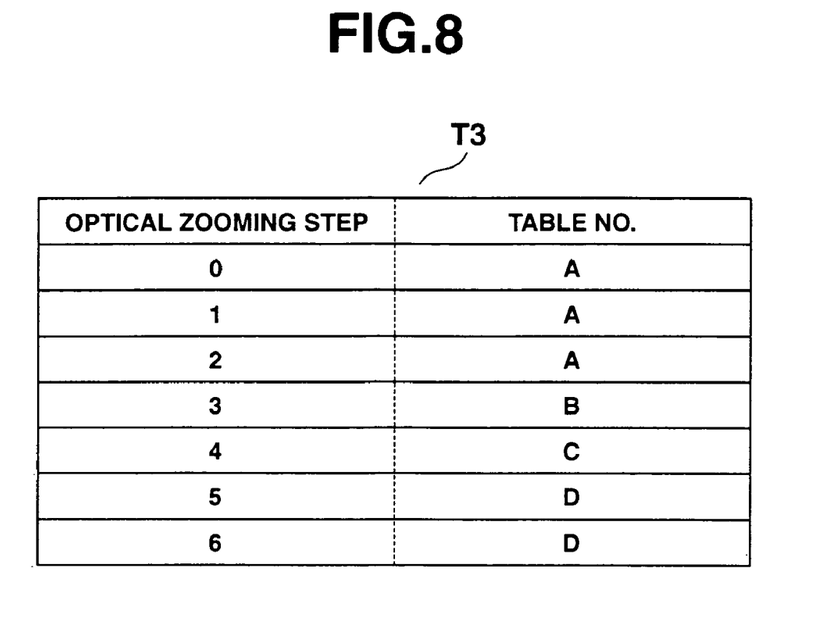
FIG. 8 is a diagram for illustratively showing a structure of a control table "T3" employed in a digital camera according to a second embodiment of the present invention.

FIG. 8 is a diagram for schematically showing a structure of a control table "T3" employed in the digital camera of the second embodiment. It should also be understood that this control table T3 (namely, third storage unit) is provided in the control unit 32 shown in FIG. 2, instead of the control table "T2."

Similar to the above-explained first embodiment, it is now assumed that since the zoom keys 20a and 20b are manipulated, the zooming lens contained in the lens optical system 22 is moved in 7 different zooming steps defined from a zooming step "0" to a zooming step "6", so that desirable zooming magnification may be set. Numeral numbers of gamma tables "A" to "D" corresponding to the respective zooming steps "0" to "6" have been stored in the control table T3. Such gamma curves (gradation correction information) which have been previously set every zooming step have been stored in these gamma tables "A" to "D."

Figure 9:
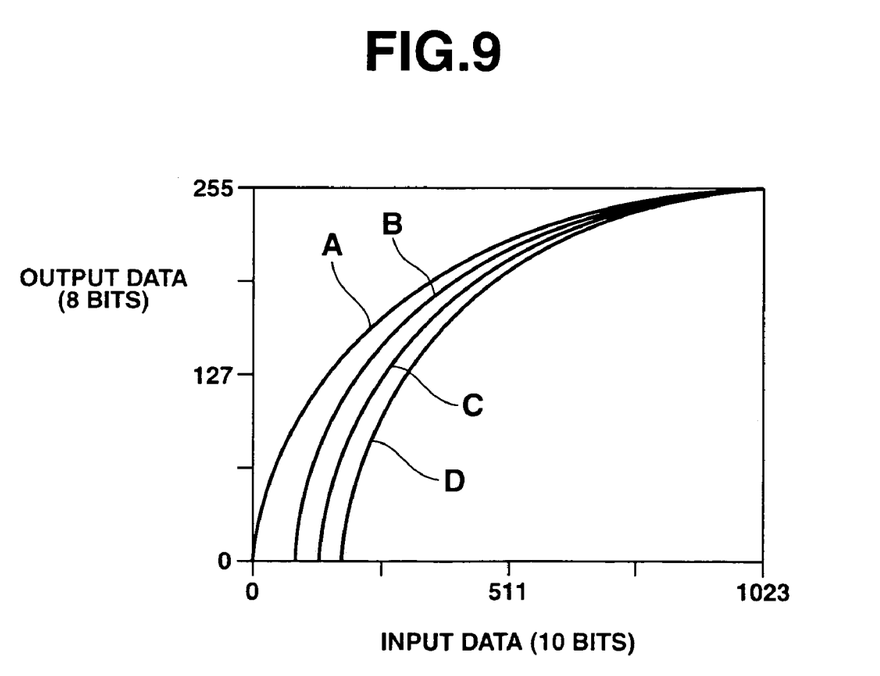
FIG. 9 is a graphic diagram for representing an example of gamma curves stored in respective gamma tables employed in the digital camera according to the second embodiment.

FIG. 9 is a graphic diagram for graphically showing an example of gamma curves which have been stored in the respective gamma tables "A" to "D." As indicated in this graphic representation, the respective gamma curves are shifted along such a direction that output image data becomes dark with respect to input image data, namely along a right direction, in this order of "B", "C", and "D", while "A" is set as a reference. The larger this shift amount becomes, the wider the output range of the black color gradation is widened, as well as, the stronger the black image portion of the image is emphasized.

It is so assumed that the above-explained gamma tables "A" to "D" have been provided in the control unit 32. Also, these gamma tables "A" to "D" are prepared with respect to a certain single photograph mode. In such a case that a large number of different photograph modes are provided, the below-mentioned gamma tables are prepared with respect to each of the photograph modes:

Photograph mode "M1" - - - gamma tables A1, B1, C1, D1.
Photograph mode "M2" - - - gamma tables A2, B2, C2, D2.
Photograph mode "M3" - - - gamma tables A3, B3, C3, D3.

It should also be noted that the above-explained photograph modes "M1" to "M3" correspond to, for instance, a "standard" contrast mode, a "low" contrast mode, and a "high" contrast mode, respectively. The gamma tables A1 to D1, the gamma tables A2 to D2, and the gamma tables A3 to D3 own gamma tables which have been set with respect to each of the zooming magnification. In this case, such numeral numbers indicative of these gamma tables A1 to D1, gamma tables A2 to D2, and gamma tables A3 to D3 are stored into the control table T3 shown in FIG. 8.

Processing Operations of Second Digital Camera

Figure 10:
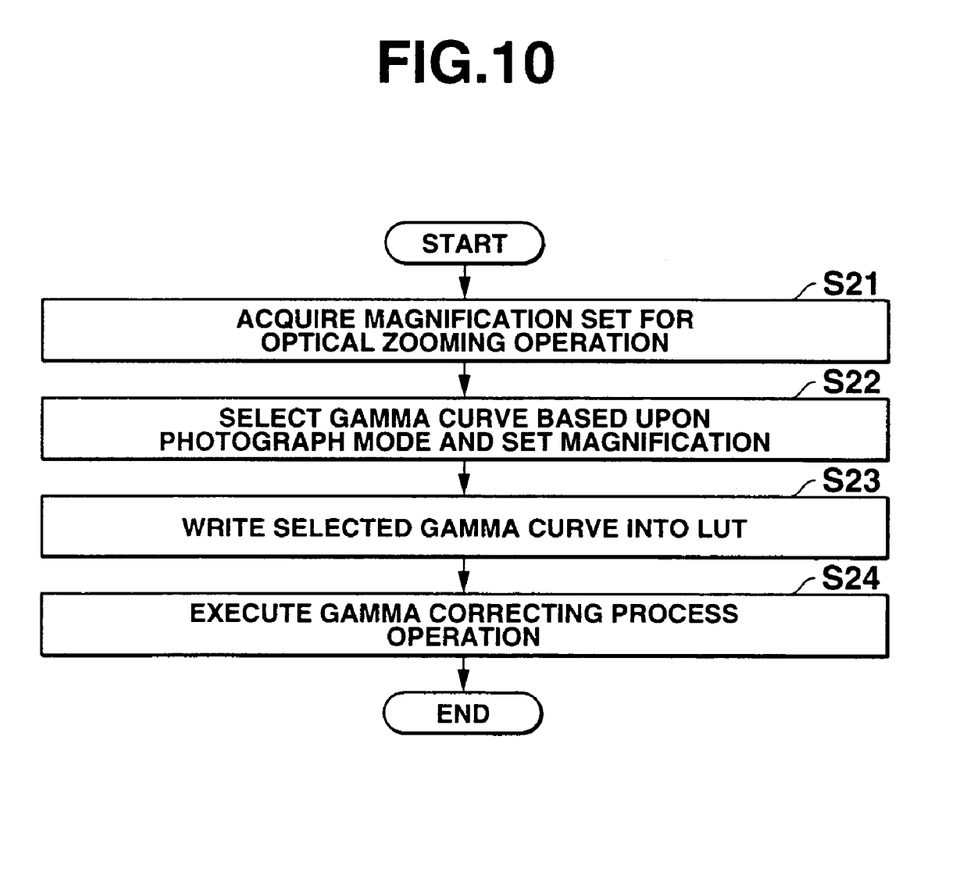
FIG. 10 is a flow chart for describing image processing operations of the digital camera according to the second embodiment.

Next, a description is made of processing operations executed by the digital camera 1 according to the second embodiment. FIG. 10 is a flow chart for describing the processing operations of the digital camera 1 according to the second embodiment. It should be understood that the above-described processing operations of the digital camera 1 may be realized by that the control unit 32 corresponding to the microprocessor mounted on the digital camera 1 reads out the program previously stored in the ROM 322 and executes the read program.

As previously explained, since the zoom keys 20a and 20b are manipulated, the zoom lens contained in the lens optical system 22 is moved in the seven zooming steps " " to "6" so as to set desirable zooming magnification.

When the desirable zooming magnification is set, the control unit 32 acquires the set magnification at this time (step S21 of FIG. 1). Precisely speaking, this set magnification corresponds to a numeral value of such a zooming step when the zoom lens is positionally set. Then, since the control unit 32 retrieves the control table T3 based upon the above-explained set magnification and the present photograph mode, the control unit 32 selects such a gamma curve which is applied when a photographing operation is carried out in this present photograph mode (step S22).

That is, for example, in the case that the present photograph mode corresponds to the above-described photograph mode "M1", and the set magnification is selected to be the zooming step number "3", the control unit 32 selects the gamma curve stored in the gamma table B1 as the gamma curve for the photographing operation. It should also be noted that when only one photograph mode has been prepared, the control unit 32 selects a gamma curve based upon the set magnification. Thus, the control unit 32 writes the gamma curve which has been selected in the above-described manner into the gamma lookup table 52 employed in the image processing circuit 28 (step S23).

Subsequently, as previously described with reference to FIG. 3, in the image processing circuit 28, the gradation of the RAW data is corrected by employing the gamma curve written into the gamma lookup table 52 (step S24). The RAW data whose gradation has been corrected is converted into such a RAW data having the YUV format, and this RAW data having the YUV format is once stored in the DRAM 31. Thereafter, this stored RAW data is read from the DRAM 31 at predetermined timing, and then, this read RAW data is compressed in accordance with the JPEG format. Finally, the JPEG format-compressed RAW data is recorded and held as the photographed image in the data storage-purpose memory 38.

As previously explained, while the plural gamma curves have been previously prepared every zooming magnification, these gamma curves are selected in response to the set magnification. As a result, similar to the first embodiment, the different contrast characteristics caused by the zooming magnification can be improved, and thus, the better photograph images can be continuously obtained in accordance with this second embodiment. In this case, since a total number of the gamma tables is increased as compared with that of the first embodiment, the memory capacity must be increased. However, the proper gamma curve can be directly obtained from the relevant gamma table while the calculating process operation is not required every time this proper gamma curve is obtained. As a result, there are such merits that the data processing operation of the second embodiment can be increased, as compared with that of the first embodiment, and furthermore, the work load given to the control unit 32 can be reduced.

Modifications

It should also be understood that in the first and second embodiments, the processing operations related to the gamma correction have been carried out in the hardware manner realized in the image processing circuit 28. Alternatively, a series of the processing operations including this gamma correcting process operation may be realized in the form of a computer program, and thus, this computer program may be executed in a software manner on the side of the control unit 32 corresponding to the microprocessor.

Also, the first and second embodiments have explained such a case that the black image portion of the image data has been corrected to be emphasized in response to the zooming magnification. Alternatively, a white image portion of the image data may be corrected to be emphasized in response to the zooming magnification in a similar correcting manner.

It should also be noted that the present invention is not limited only the above-explained digital camera, but may be applied to all of electronic appliances if optical zooming functions are provided, for instance, may be applied to any type of portable telephones equipped with cameras having optical zooming functions. In particular, the merit of the present invention may be conspicuously realized with respect to compact appliances such as portable telephones equipped with cameras. That is, since sizes of optical lens systems are small, and contrast characteristics are easily and adversely influenced by zooming magnification in such portable telephones equipped with cameras, the merit of the present invention may be emphasized.

As apparent from the foregoing descriptions, the present invention is not limited only to the above-described embodiments, but may be modified without departing from the technical spirit and scope of the present invention. Further, the inventive idea of the present invention may be realized by combining the plural structural elements disclosed in the respective embodiments with each other in a proper manner. For example, several structural elements maybe deleted from all of the structural elements indicated in the embodiments. In addition, structural elements disclosed in the different embodiments may be properly combined with each other.

What is claimed is:

1. A photographing apparatus comprising:
an optical zooming unit for moving a lens so as to change an enlarging ratio of a photographic object;
an imaging unit for imaging the photographic object;
a magnification acquiring unit for acquiring a magnification set by the optical zooming unit;
a gradation setting unit for setting gradation correcting information which is applied during a photographing operation based on the set magnification acquired by the magnification acquiring unit;
a correcting unit for correcting gradation of image data outputted from the imaging unit by employing the gradation correcting information set by the gradation setting unit;
a first storage unit which stores gradation correcting information as a reference; and
a second storage unit which stores changing information which is used to change the gradation correcting information stored in the first storage unit based on the set magnification;
wherein the gradation setting unit changes the gradation correcting information stored in the first storage unit based on the changing information stored in the second storage unit, and the gradation setting unit sets the changed gradation correcting information as the gradation correcting information which is applied during the photographing operation.

2. A photographing apparatus as claimed in claim 1, wherein:
gradation correcting information is stored in the first storage unit with respect to each of plural different photographing modes; and
the gradation setting unit selects gradation correcting information corresponding to a present photographing mode from the first storage unit, and changes the selected gradation correcting information based on the changing information.

3. A photographing apparatus as claimed in claim 1, wherein the changing information stored in the second storage unit emphasizes a black image portion of a photographed image in accordance with higher magnification.

4. A photographing apparatus as claimed in claim 1, wherein the gradation correcting information stored in the first storage unit corresponds to a gamma curve whose input data is 10 bits and whose output data is 8 bits.

5. A photographing apparatus comprising:
an optical zooming unit for moving a lens so as to change an enlarging ratio of a photographic object;
an imaging unit for imaging the photographic object;
a magnification acquiring unit for acquiring a magnification set by the optical zooming unit;
a gradation setting unit for setting gradation correcting information which is applied during a photographing operation based on the set magnification acquired by the magnification acquiring unit;
a correcting unit for correcting gradation of image data outputted from the imaging unit by employing the gradation correcting information set by the gradation setting unit; and
a storage unit which stores a plurality of gradation correcting information corresponding to different magnifications;
wherein the gradation setting unit selects the gradation correcting information which is applied during the photographing operation from the storage unit based on the set magnification acquired by the magnification acquiring unit.

6. A photographing apparatus as claimed in claim 5, wherein:
a plurality of gradation correcting information corresponding to different magnifications are stored in the storage unit with respect to each of plural different photographing modes; and
the gradation setting unit selects the gradation correcting information which is applied during the photographing operation from the storage unit based on both a present photographing mode and the set magnification.

7. A photographing apparatus as claimed in claim 5, wherein the gradation correcting information stored in the storage unit emphasizes a black image portion of a photographed image in accordance with higher magnification.

8. A photographing apparatus as claimed in claim 5, wherein the gradation correcting information stored in the storage unit corresponds to a gamma curve whose input data is 10 bits and whose output data is 8 bits.

9. An image processing method used in a photographing apparatus equipped with an imaging unit for imaging a photographic object and having an optical zooming function, the method comprising:
storing reference gradation correcting information;
storing changing information which is used to change the reference gradation correcting information based on a magnification set by the optical zooming function;
acquiring the magnification set by the optical zooming function;
setting gradation correcting information which is applied during a photographing operation based on the acquired magnification, by changing the reference gradation correcting information based on the changing information and setting the changed gradation correcting information as the gradation correcting information which is applied during the photographing operation; and
correcting gradation of image data outputted from the imaging unit by employing the set gradation correcting information.

10. A computer-readable recording medium having stored thereon an image processing program which is executable by a computer of a photographing apparatus equipped with an imaging unit for imaging a photographic object and having an optical zooming function, wherein the photographing apparatus comprises a first storage unit which stores gradation correcting information as a reference, and a second storage unit which stores changing information which is used to change the gradation correcting information stored in the first storage unit based on a magnification set by the optical zooming function, and wherein the image processing program causes the computer to execute a process comprising:
acquiring the magnification set by the optical zooming function;
setting gradation correcting information which is applied during a photographing operation based on the set magnification by changing the gradation correcting information stored in the first storage unit based on the changing information stored in the second storage unit and setting the changed gradation correcting information as the gradation correcting information which is applied during the photographing operation; and
correcting gradation of image data outputted from the imaging unit by employing the set gradation correcting information.

11. An image processing method used in a photographing apparatus equipped with an imaging unit for imaging a photographic object and having an optical zooming function, the method comprising:
storing a plurality of gradation correcting information corresponding to different magnifications of the optical zooming function;
acquiring a magnification set by the optical zooming function;
selecting gradation correcting information, from among the plurality of stored gradation correcting information, based on the acquired magnification, and setting the selected gradation correcting information as gradation correcting information which is applied during a photographing operation; and
correcting gradation of image data outputted from the imaging unit by employing the set gradation correcting information.

12. A computer-readable recording medium having stored thereon an image processing program which is executable by a computer of a photographing apparatus equipped with an imaging unit for imaging a photographic object and having an optical zooming function, wherein the photographing apparatus comprises a storage unit which stores a plurality of gradation correcting information corresponding to different magnifications of the optical zooming function, and wherein the image processing program causes the computer to execute a process comprising:
acquiring a magnification set by the optical zooming function;
selecting gradation correcting information, from among the plurality of gradation correcting information stored in the storage unit, based on the acquired magnification, and setting the selected gradation correcting information as gradation correcting information which is applied during a photographing operation; and
correcting gradation of image data outputted from the imaging unit by employing the set gradation correcting information.

* * * * *